United States Patent
Wakabayashi et al.

(10) Patent No.: US 8,967,338 B2
(45) Date of Patent: Mar. 3, 2015

(54) DISC BRAKE

(71) Applicant: Hitachi Automotive Systems, Ltd., Hitachinaka-shi, Ibaraki (JP)

(72) Inventors: Nobuhiro Wakabayashi, Kai (JP); Satoru Tsurumi, MinamiALPS (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 28 days.

(21) Appl. No.: 13/795,743

(22) Filed: Mar. 12, 2013

(65) Prior Publication Data

US 2014/0090932 A1    Apr. 3, 2014

(30) Foreign Application Priority Data

Mar. 15, 2012   (JP) .................. 2012-058706

(51) Int. Cl.
  *F16D 55/00* (2006.01)
  *F16D 65/00* (2006.01)
  *F16D 69/00* (2006.01)
  *F16D 55/228* (2006.01)
  *F16D 65/097* (2006.01)

(52) U.S. Cl.
  CPC .......... *F16D 55/228* (2013.01); *F16D 65/0971* (2013.01); *F16D 65/0006* (2013.01)
  USPC .................. 188/73.31; 188/73.1; 188/250 B; 188/250 G (58) Field of Classification Search
  USPC ......... 188/71.1, 72.1, 72.3, 72.4, 73.1, 73.31, 188/73.32, 73.35–73.37, 250 B, 250 G, 188/250 E, 250 D, 250 F
  See application file for complete search history.

(56) References Cited

U.S. PATENT DOCUMENTS

| 5,706,917 | A | * | 1/1998 | Matsuzaki ................. 188/73.38 |
| 6,257,379 | B1 | * | 7/2001 | Matsumoto et al. ....... 188/73.31 |
| 2006/0157307 | A1 | * | 7/2006 | Tsurumi et al. ........... 188/250 G |

FOREIGN PATENT DOCUMENTS

JP    2001-041268    2/2001

* cited by examiner

*Primary Examiner* — Vishal Sahni
(74) *Attorney, Agent, or Firm* — Nixon & Vanderhye P.C.

(57) ABSTRACT

A shim plate relatively movably attached with a friction pad in a rotational direction of a disc is disposed between the friction pad and a reaction section of a caliper, a plurality of claw sections formed to extend in a radial direction of the disc at a position deviated in the rotational direction of the disc with respect to a center of pistons are formed at the reaction section, and movement restriction portions that can abut the intermediate claw section disposed at the middle of the claw sections of the reaction section are formed at a surface of the shim plate opposite to the reaction section in the radial direction of the disc.

21 Claims, 7 Drawing Sheets

DISC BRAKE

BACKGROUND OF THE INVENTION

1. Field of the Invention

The present invention relates to a disc brake configured to brake a vehicle.

This application claims priority to and the benefit of Japanese Patent Application No. 2012-058706 filed on Mar. 15, 2012, the disclosure of which is incorporated by reference herein.

2. Background Art

In a disc brake, in order to enable relative movement between a friction pad and a caliper upon braking, a shim attached by the friction pad is disposed therebetween. A restriction piece configured to suppress relative movement with respect to the friction pad to a predetermined amount is formed in the shim (for example, Japanese Unexamined Patent Application, First Publication No. 2001-41268).

In the above-mentioned disc brake, workability upon maintenance such as removal of the caliper from a carrier upon exchange of the pad is not good.

SUMMARY OF THE INVENTION

The present invention provides a disc brake capable of improving workability upon maintenance.

According to a first aspect of the present invention, a disc brake includes an bracket configured to be attached to a vehicle, a pair of friction pads movably supported by the bracket and disposed at both surfaces of a disc, and a caliper movably supported with respect to the bracket in an axial direction of the disc. The caliper includes a cylinder section in which a plurality of pistons configured to press one friction pad of the pair of friction pads are installed in parallel in a rotational direction of the disc, a bridge section extending from the cylinder section to straddle an outer circumference of the disc, a reaction section extending from the bridge section inward in a radial direction of the disc and configured to press the other friction pad of the pair of friction pads, and an arm section extending from the cylinder section in the rotational direction of the disc and having a tip side to which a slide pin guided to the bracket is attached. A shim plate attached with the other friction pad to be relatively moved in the rotational direction of the disc is disposed between the other friction pad and the reaction section. A plurality of claw sections are formed at the reaction section to extend in the radial direction of the disc at a position deviated in the rotational direction of the disc with respect to a center of the piston. A movement restriction portion that is capable of contacting a claw section disposed at a middle of claw sections of the reaction section is stood up at a surface of the shim plate opposite to the reaction section in the radial direction of the disc.

According to a second aspect of the present invention, the movement restriction portion is formed by cutting and standing a part of the shim plate from a surface section of the shim plate opposite to the other friction pad and extends in a direction away from the disc. The movement restriction portion is formed at a position at which the claw section disposed at the middle does not abut when the end section of the outside in the radial direction of the disc rotates the caliper about the slide pin with respect to the bracket.

The movement restriction portions may stand at both sides of the claw section disposed at the middle in the rotational direction of the disc.

A tip portion one of the each movement restriction portions may contact the claw section disposed at the middle.

Tip portions of both the movement restriction portions may resiliently contact the claw section disposed at the middle.

The movement restriction portions may stand only at an inlet side of the rotational direction of the disc with respect to the claw section disposed at the middle.

The movement restriction portion may extend to be inclined in the rotational direction of the disc toward a center of the claw section disposed at the middle in the axial direction of the disc, and the tip side may abut the claw section disposed at the middle.

The movement restriction portion may be formed to be reduced in size as it moves from a base end section toward the tip section.

The shim plate may be provided with a hole configured to engage with a protrusion protruding in the axial direction of the disc from the friction pad.

According to a third aspect of the present invention, a disc brake includes a caliper configured to press a pair of friction pads on a disc wherein the pair of friction pads movably supported by an bracket configured to be attached on a vehicle. The caliper comprises a plurality of piston disposed in parallel in a rotational direction of the disc so as to oppose one friction pad of the pair of friction pads, and three or more claw sections disposed opposing to the other friction pad of the pair of friction pads at a side opposite to the piston with respect to the disc. A shim plate attached with the other friction pad is disposed between the other friction pad and the claw sections. A movement restriction portion that is capable of contacting a middle claw section disposed at a middle of claw sections is stood up at a surface of the shim plate along the radial direction of the disc on both sides of the middle claw section in a rotational direction of the disc.

The movement restriction portion may be formed by cutting and standing a part of the shim plate from a surface section of the shim plate opposite to the other friction pad and extending in a direction away from the disc.

The movement restriction portion may be formed at a position at which the claw section disposed at the middle does not contact when the end section of the outside in the radial direction of the disc rotates the caliper about a supporting portion of the bracket with respect to the bracket.

The shim plate may be provided with a hole configured to engage with a protrusion protruding in the axial direction of the disc from the friction pad.

According to a fourth aspect of the present invention, a disc brake includes a caliper configured to press one friction pad of a pair of friction pads disposed both sides of the disc by a plurality of piston disposed in parallel in a rotational direction of the disk, the caliper is provided with three or more claw sections configured to press an other friction pad of the pair of friction pads, a shim plate attached with the other friction pad disposed between the other friction pad and the claw sections; and a movement restriction portion that is capable of resiliently contacting a middle claw section provided at a surface of the shim plate on both sides of the middle claw section in a rotational direction of the disc, the movement restriction portion extending in an axial direction of the disc along a radial direction of the disc.

The movement restriction portion may be formed at a position at which the claw section disposed at the middle does not contact when the end section of the outside in the radial direction of the disc rotates the caliper about an one end portion of the friction pad in the rotational direction of the friction pad with respect to the friction pad.

According to the above-mentioned disc brake, workability upon maintenance of the disc brake can be improved.

DETAILED DESCRIPTION OF THE INVENTION

A disc brake according to an embodiment of the present invention will be described below with reference to the accompanying drawings. A disc brake 10 according to the embodiment, which is used for a vehicle such as an automobile or the like. The disc brake is configured to brake the vehicle by stopping rotation of a disc 11 rotated with a wheel (not shown). In addition, in the following description, an axial direction of the disc 11 is referred to as a disc axial direction, a radial direction of the disc 11 is referred to as a disc radial direction, and a rotational direction of the disc 11 is referred to as a disc rotational direction.

Figure 1:
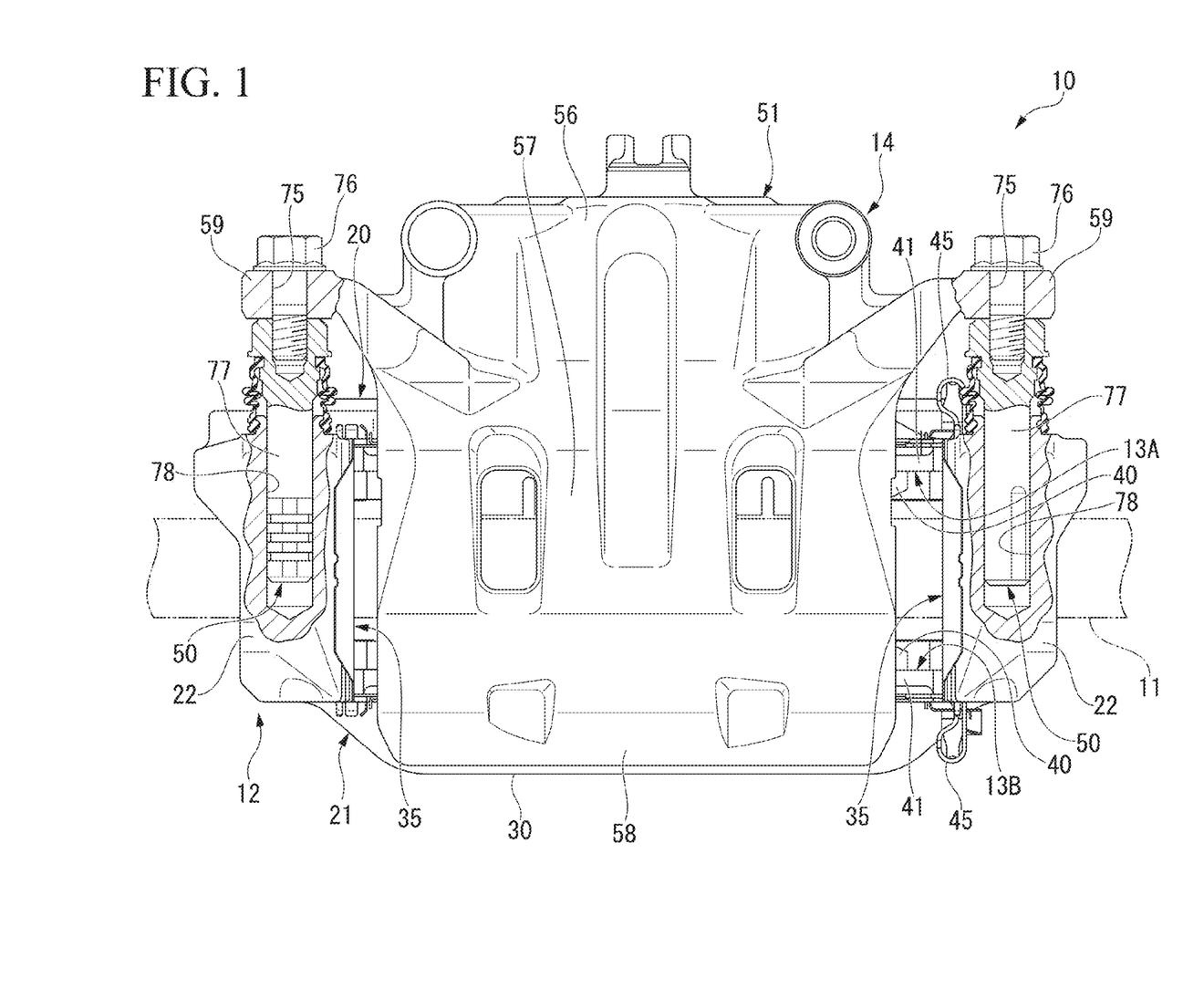
FIG. 1 is a plan view showing a disc brake according to an embodiment of the present invention.

As shown in FIG. 1, the disc brake 10 includes a bracket 12, a pair of friction pads 13A and 13B movably supported by the bracket 12 in the disc axial direction and disposed at both surfaces of the disc 11, and a caliper 14 movably supported with respect to the bracket 12 in the disc axial direction.

Figure 2:
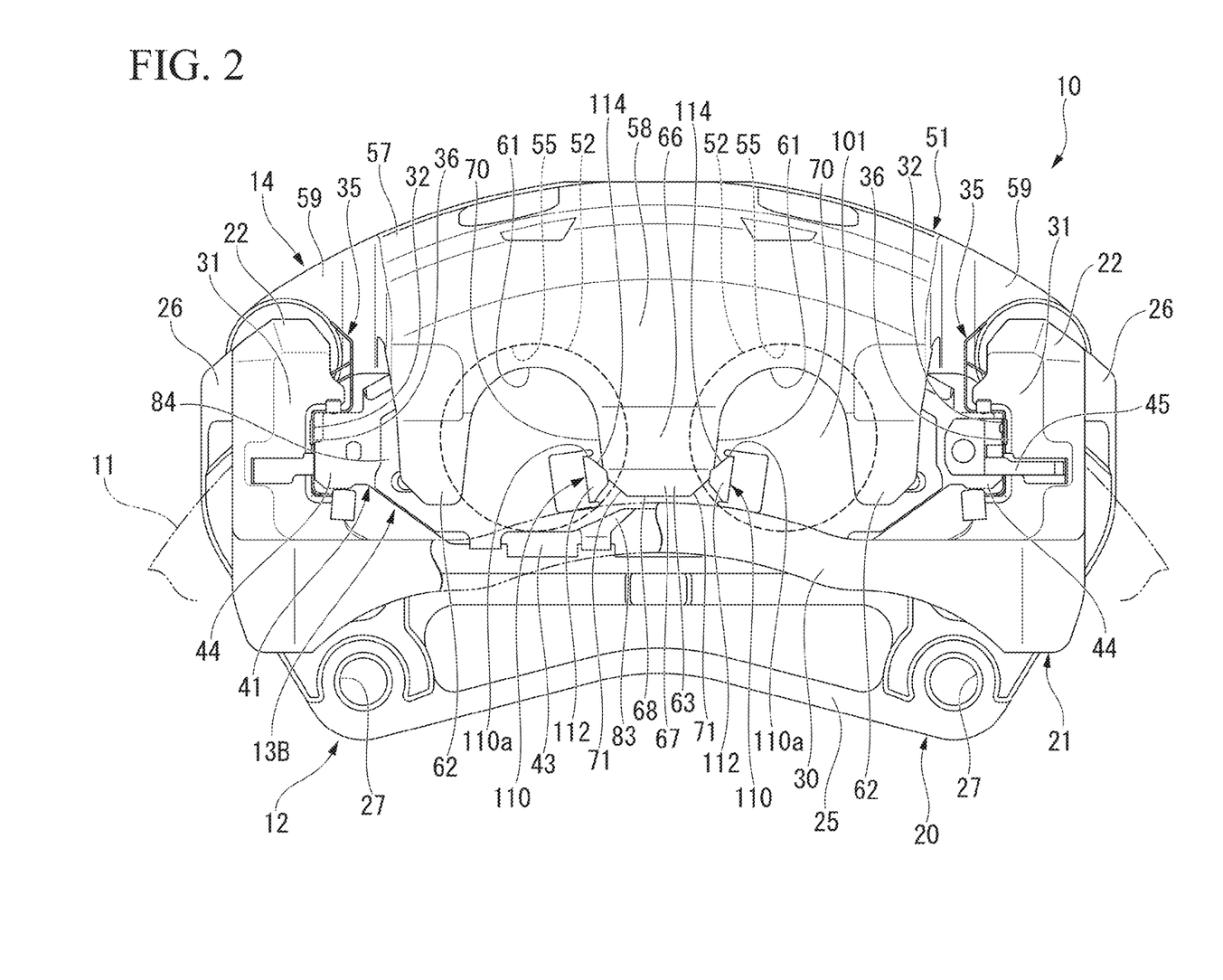
FIG. 2 is a front view showing the disc brake according to the embodiment of the present invention.
Figure 3:
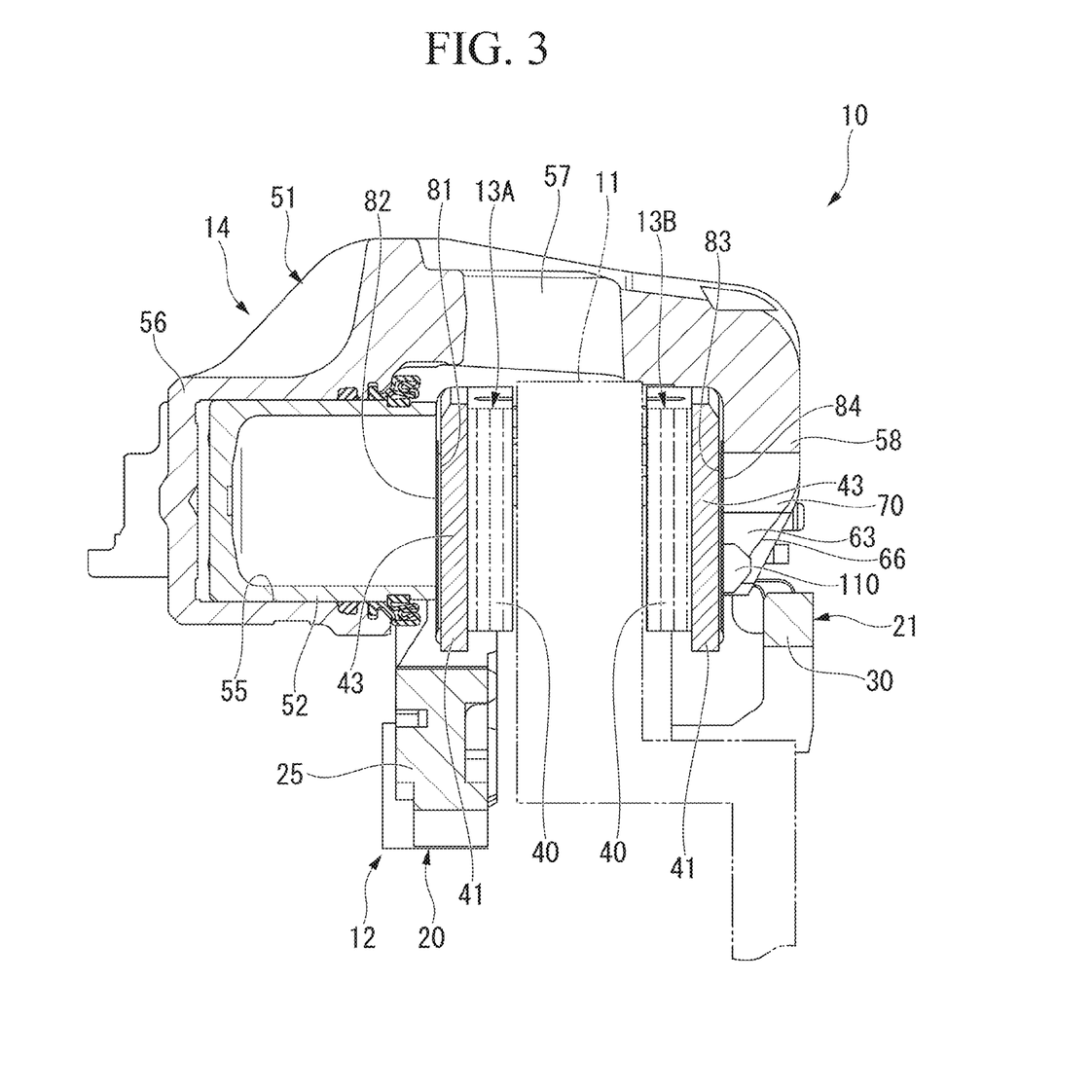
FIG. 3 is a cross-sectional view showing the disc brake according to the embodiment of the present invention.

As shown in FIGS. 1 and 2, the bracket 12 is fixedly attached to a non-rotation section of a vehicle to be disposed to straddle an outer circumference side of the disc 11. As shown in FIG. 3, the bracket 12, which is an integrated molding, has an attachment base section 20 disposed to oppose a surface of an inner side of the disc 11 (the inside in the vehicle width direction: a left side of FIG. 3), a spacing disposition section 21 disposed to be spaced apart from the attachment base section 20 to oppose a surface of an outer side of the disc 11 (the outside in the vehicle width direction: a right side of FIG. 3), and a pair of connecting sections 22 connecting the attachment base section 20 and the spacing disposition section 21 at both end positions in the rotational direction of the disc 11 while passing over the outer circumference of the disc 11 as shown in FIG. 1 and configured to.

As shown in FIG. 2, the attachment base section 20 has a base main body section 25 extending in the disc rotational direction, and a pair of pad support sections 26, 26 extending from both end sections in the disc rotational direction of the base main body section 25 to the outside in the disc radial direction. The end sections of the pair of pad support sections 26, 26 opposite to the base main body section 25 side are connected to the connecting sections 22, 22. Two attachment holes 27, 27 are formed in both ends of the attachment base section 20 in the disc rotational direction of the base main body section 25. The bracket 12 is fixed to the non-rotation section of the vehicle by fasteners (bolts) screwed into the attachment holes 27, 27.

The spacing disposition section 21 of the outer side has an outer beam section 30 extending in the disc rotational direction, and a pair of pad support sections 31, 31 extending from both end sections in the disc rotational direction of the outer beam section 30 to the outside in the disc radial direction. The end sections of the pair of pad support sections 31, 31 opposite to the outer beam section 30 side are connected to the connecting sections 22, 22.

Support concave sections 32, 32 concaved in the disc rotational direction are formed in opposite surfaces of the pair of pad support sections 31, 31 of the outer side. While not shown, the same support concave sections are also formed in opposite surfaces of the pair of pad support sections 26, 26 of the inner side.

Two common pad springs 35, 35, which are formed at two places in parallel in the disc axial direction at the same side in the disc rotational direction, are disposed at the pair of pad support sections 26, 26 and the pair of pad support sections 31, 31. A concave plate section 36 fitted into the support concave section 32 of the pad support section 31 and a concave plate section (not shown) fitted into a support concave section (not shown) of the pad support section 26 are formed at the pad springs 35, 35, respectively.

As shown in FIG. 1, one friction pad 13A of the pair of friction pads 13A and 13B is disposed at the inner side (an upper side of FIG. 1) of the disc 11. As shown in FIG. 2, the friction pad 13A is supported by the pair of pad support sections 26, 26 via the two pad springs 35, 35 to be slidable in the disc axial direction.

As shown in FIG. 1, the other friction pad 13B of the pair of friction pads 13A and 13B is disposed at the outer side (a lower side of FIG. 1) of the disc 11. As shown in FIG. 2, the friction pad 13B is supported by the pair of pad support sections 31, 31 via the two pad springs 35, 35 to be slidable in the disc axial direction.

As shown in FIG. 3, the friction pads 13A and 13B have the same shape, and are constituted by a friction material 40 and a rear plate 41 to which the friction material 40 is adhered to one side in a thickness direction thereof. As shown in FIG. 2, the rear plate 41 has a main plate section 43 to which the friction material 40 is adhered, and a pair of convex sections 44, 44 protruding from an intermediate position in the disc radial direction of both end sections in the disc rotational direction of the main plate section 43 to the outside in the disc rotational direction.

In the friction pad 13B of the outer side, the pair of convex sections 44, 44 of the both sides in the disc rotational direction are inserted into the concave plate sections 36, 36 of the outer side of the two pad springs 35, 35. Accordingly, in the friction pad 13B of the outer side, the pair of convex sections 44, 44 are supported by the support concave sections 32, 32 of the pair of pad support sections 31, 31 of the outer side via the concave plate sections 36 of the outer side of the two pad springs 35, 35 to be slidable in the disc axial direction. In addition, upon the braking, the bracket 12 mainly receives a braking torque of the friction pad 13B with the pad support section 31 of an outlet side in the disc rotational direction. More specifically, the braking torque is mainly received by a region of the pad support portion from a tip surface of the outlet side in the disc rotational direction of the friction pad 13B, which is a tip in a direction of the convex section 44, to a bottom surface of the outlet side in the disc rotational direction, which is a tip in a direction of the support concave section 32. A return spring 45 which contacts the outer side of the pad support section 31 is attached to one outer side of the pair of convex sections 44, 44.

In the friction pad 13A of the inner side shown in FIG. 1, like the outer side, a pair of convex sections (not shown) of both sides in the disc rotational direction are inserted into concave plate sections (not shown) of the inner side of the two pad springs 35, 35. Accordingly, a pair of convex sections (not shown) of the friction pad 13A of the inner side are supported by support concave sections (not shown) of the pair of pad support sections 26, 26 shown in FIG. 2 of the inner side via concave plate sections (not shown) of the inner side of the two pad springs 35, 35, respectively, to be slidable in the disc axial direction. As shown in FIG. 1, the return spring 45 is also attached to the friction pad 13A of the inner side at the same side in the disc rotational direction as the friction pad 13B of the outer side.

The caliper 14 has a pair of slide pins 50, 50 slidably fitted into the pair of connecting sections 22, 22 of the bracket 12 in the disc axial direction, a caliper body 51 attached to the slide pins 50, 50 and supported by the bracket 12 to be slidable in the disc axial direction via the slide pins 50, 50, and as shown in FIG. 3, a piston 52 slidably supported by the caliper body 51 to oppose the friction pad 13A of the inner side at an opposite side of the disc 11.

The caliper body 51 has a cylinder section 56 having a bore 55 into which the piston 52 is slidably fitted, a bridge section 57 extending in the disc axial direction to straddle the outer circumference of the disc 11 from the outside in the disc radial direction of the cylinder section 56, and a reaction section 58 extending inward in the disc radial direction from the bridge section 57 opposite to the cylinder section 56 and configured to oppose the friction pad 13B of the outer side at an opposite side of the disc 11. In addition, as shown in FIG. 1, the caliper body 51 has a pair of arm sections 59, 59 extending from the cylinder section 56 in the disc rotational direction and having a tip side to which the above-mentioned slide pins 50 guided by the bracket 12 are attached. The caliper body 51 is an integrated molding formed by casting.

As shown in FIG. 2, the bores 55, 55 configured to hold the piston 52 are formed in the cylinder section 56 at a plurality of places, specifically, two places, in parallel in the disc rotational direction. Accordingly, a plurality of, specifically, two pistons 52, 52 are installed at the cylinder section 56 in parallel in the disc rotational direction.

A plurality of, specifically, two recesses 61, 61 are formed in the reaction section 58 to match positions one to one in the disc rotational direction with respect to a center of the above-mentioned two bores 55, 55, i.e., the pistons 52, 52. The recesses 61, 61 are portions through which tools configured to process the inside of the bores 55, 55 pass. Accordingly, the same number of recesses 61, 61 as the bores 55, 55, i.e., the pistons 52, 52 are formed in the reaction section 58. The tips of the recesses 61, 61 are concaved in a semi-circular shape from an inner end in the disc radial direction of the reaction section 58 to the outside in the disc radial direction.

As the above-mentioned recesses 61, 61 are formed, end side claw sections 62, 62 extending inward in the disc radial direction are formed at the reaction section 58 at both outer sides in the disc rotational direction of the recesses 61, 61. In addition, an intermediate claw section 63 extending inward in the disc radial direction is formed at the reaction section 58 also in the disc rotational direction between the recesses 61, 61. That is, three claw sections including end side claw sections 62, 62 and the intermediate claw sections 63, that is one more than the number of recesses 61, 61, which is the same as that of the bores 55, 55 and the pistons 52, 52, are formed at the reaction section 58. As the above-mentioned two recesses 61, 61 are matched with positions in the disc rotational direction one to one with respect to the two pistons 52, 52, three of the end side claw sections 62, 62 and the intermediate claw section 63 are formed at positions deviated in the disc rotational direction with respect to a center of the pistons 52, 52. The end side claw sections 62, 62 disposed at the outside in the disc rotational direction have a mirror symmetrical shape in the disc rotational direction with respect to each other. In addition, the intermediate claw section 63 disposed in the middle in the disc rotational direction has a mirror symmetrical shape in the disc rotational direction with respect to a center in the disc rotational direction. In addition, the end side claw sections 62, 62 may not be necessarily to have a mirror symmetrical shape in the disc rotational direction. Further, the intermediate claw section 63 may not have a mirror symmetrical shape in the disc rotational direction with respect to a center in the disc rotational direction.

An intermediate outer surface section 66 inclined in the disc radial direction to be disposed at the inner side in the disc axial direction to an extent of the inside in disc radial direction, and a tip outer surface section 67 inclined at a larger angle than the intermediate outer surface section 66 from an inner edge in the disc radial direction of the intermediate outer surface section 66 are formed at the outer side in the disc axial direction of the intermediate claw section 63. The intermediate outer surface section 66 and the tip outer surface section 67 are formed to extend in a direction along the disc rotational direction. The edge section of the tip outer surface section 67 opposite to the intermediate outer surface section 66 is bounded by a tip surface section 68 in the disc axial direction and the disc rotational direction disposed at the inner end in the disc radial direction of the intermediate claw section 63.

In addition, the pair of intermediate side surface sections 70, 70 inclined in the disc radial direction to be disposed at a center side of the intermediate claw section 63 in the disc rotational direction to an extent of the inside in the disc radial direction, and a pair of tip side surface sections 71, 71 inclined in the same direction at a larger angle than the intermediate side surface sections 70, 70 from the inner edge in the disc radial direction of the intermediate side surface sections 70, 70 are formed at both sides in the disc rotational direction of the intermediate claw section 63. The intermediate side surface sections 70, 70 and the tip side surface sections 71, 71 are surfaces extending in a direction along the disc axial direction. The edge sections of the pair of tip side surface sections 71, 71 opposite to the intermediate side surface sections 70, 70 are bounded by the tip surface section 68. A boundary position between the intermediate side surface sections 70, 70 and the tip side surface sections 71, 71 in disposed further inside in the disc radial direction than a boundary position between the intermediate outer surface section 66 and the tip outer surface section 67.

As shown in FIG. 1, each of the pair of slide pins 50, 50 has an attachment bolt 76 inserted into a through-hole 75 formed in the disc axial direction of the arm section 59 from the inner side, and a pin main body 77 disposed at the outer side of the arm section 59 and threadedly engaged with the attachment bolt 76. The pair of slide pins 50, 50 is fitted into the guide holes 78, 78 formed in the connecting sections 22, 22 of the bracket 12 to be slidable in the pin main bodies 77, 77.

As shown in FIG. 3, in the caliper 14, when the pistons 52, 52 move forward by a brake liquid pressure introduced into the bores 55, 55 of the cylinder section 56, the pistons 52, 52 press the friction pad 13A of the inner side toward the disc 11, and thus, the friction pad 13A moves on the bracket 12 in the disc axial direction via the pad springs 35, 35 shown in FIG. 1, bringing the friction material 40 in contact with the disc 11. In addition, the caliper 14 moves to the inner side in the disc axial direction with respect to the bracket 12 via the slide pins 50, 50 by a reaction force of the pressing force, and the friction pad 13B of the outer side is pressed toward the disc 11 by the reaction section 58. Accordingly, the friction pad 13B moves on the bracket 12 in the disc axial direction via the pad springs 35, 35 to bring the friction material 40 in contact with the disc 11. As a result, in the caliper 14, the pair of friction pads 13A and 13B are sandwiched by the pistons 52, 52 and the reaction section 58 from both sides thereof to contact the disc 11, and a frictional resistance is applied to the disc 11, generating a braking force.

As shown in FIG. 3, two shim plates 81 and 82 are disposed between the rear plate 41 of the friction pad 13A of the inner side and the pistons 52, and two shim plates 83 and 84 are also disposed between the rear plate 41 of the friction pad 13B of the outer side and the reaction section 58. In addition, it is not necessarily to provide two shim plates, but one shim plate or three or more shim plates may be provided.

Figure 4A:
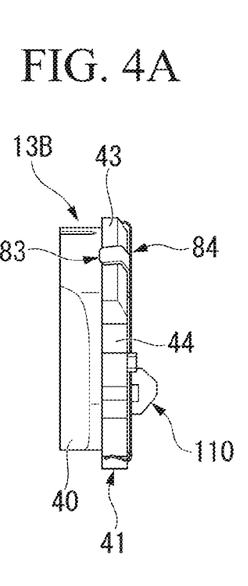
FIG. 4A is a side view showing an assembly of a friction pad and a shim plate of the disc brake according to the embodiment of the present invention.

Next, referring mainly to FIGS. 4 and 5, the friction pad 13B of the outer side and the two shim plates 83 and 84 attached thereto will be described.

Figure 4B:
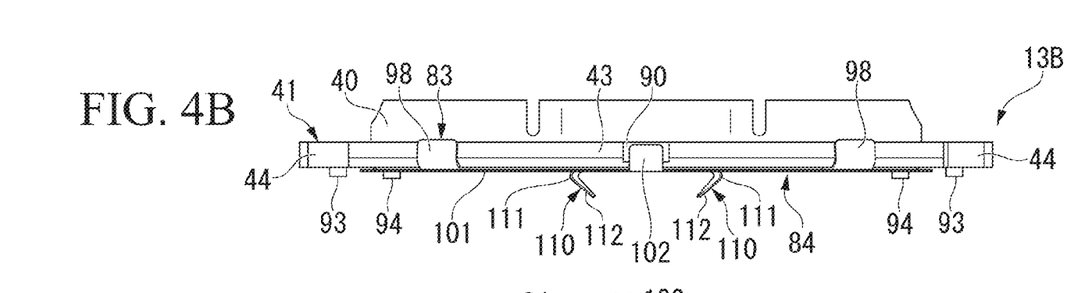
FIG. 4B is a plan view showing the assembly of the friction pad and the shim plate of the disc brake according to the embodiment of the present invention.
Figure 4C:
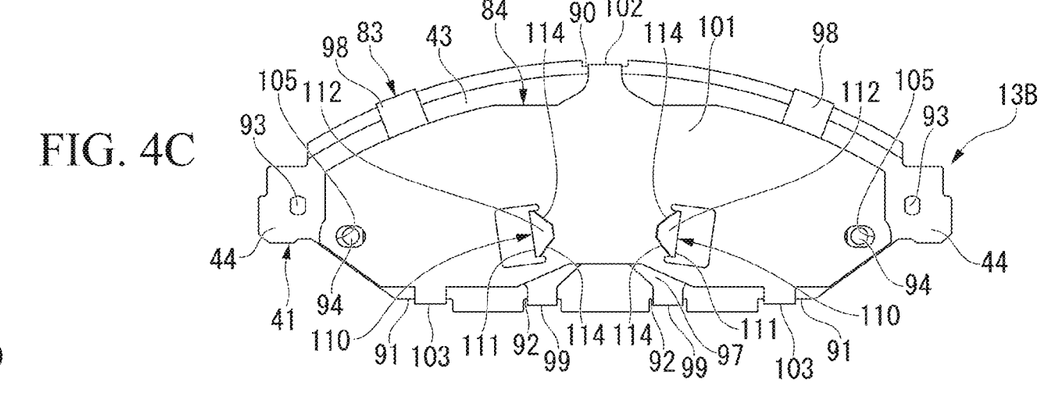
FIG. 4C is a front view showing the assembly of the friction pad and the shim plate of the disc brake according to the embodiment of the present invention.
Figure 4D:
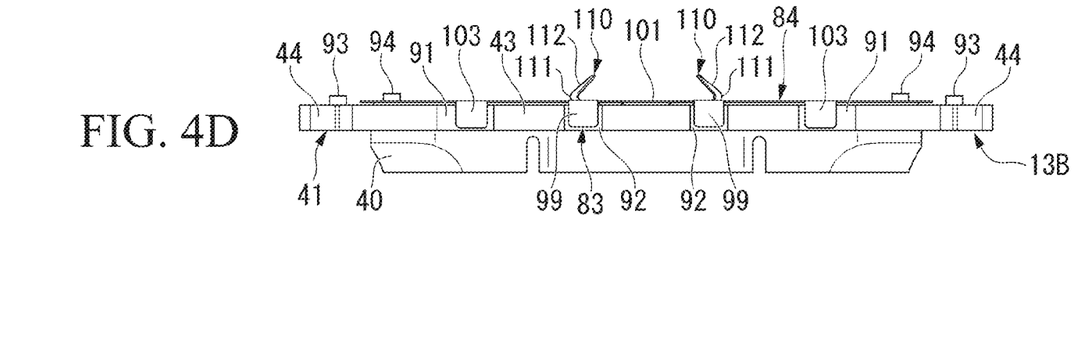
FIG. 4D is a bottom view showing the assembly of the friction pad and the shim plate of the disc brake according to the embodiment of the present invention.
Figure 5A:
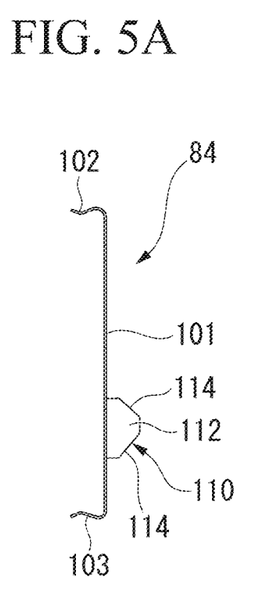
FIG. 5A is a side view showing the shim plate of the disc brake according to the embodiment of the present invention.
Figure 5B:
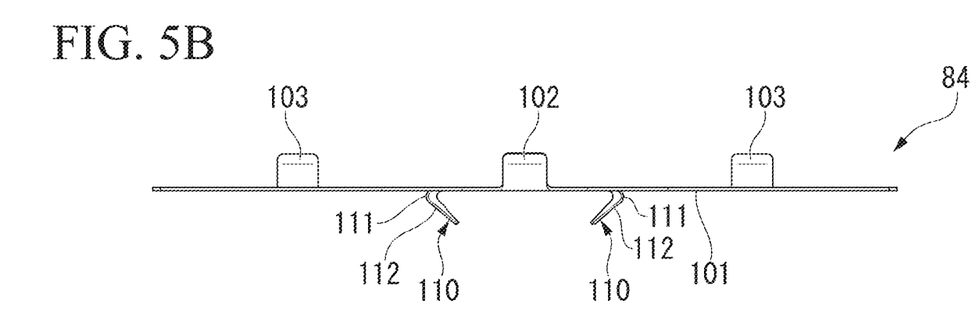
FIG. 5B is a plan view showing the shim plate of the disc brake according to the embodiment of the present invention.
Figure 5C:
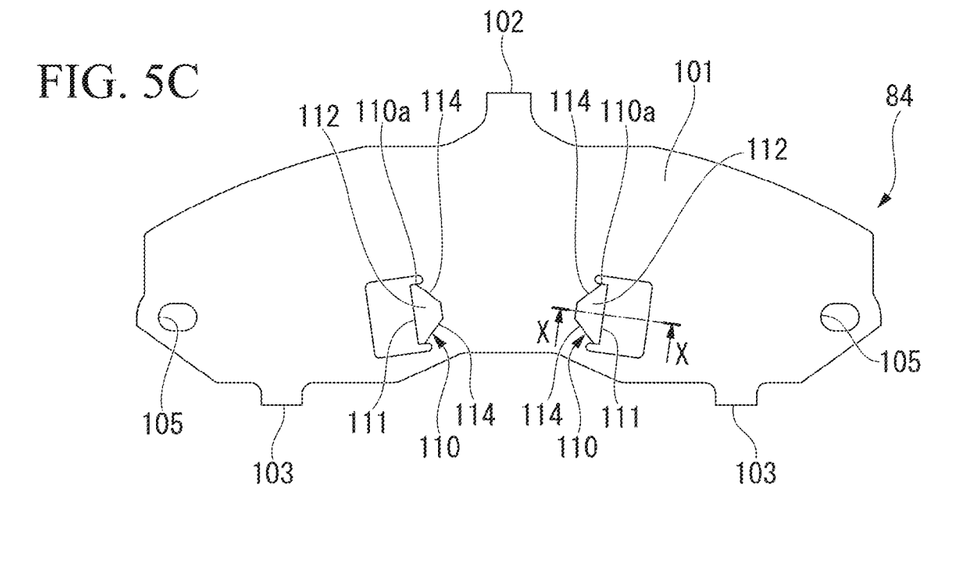
FIG. 5C is a front view showing the shim plate of the disc brake according to the embodiment of the present invention.
Figure 6:
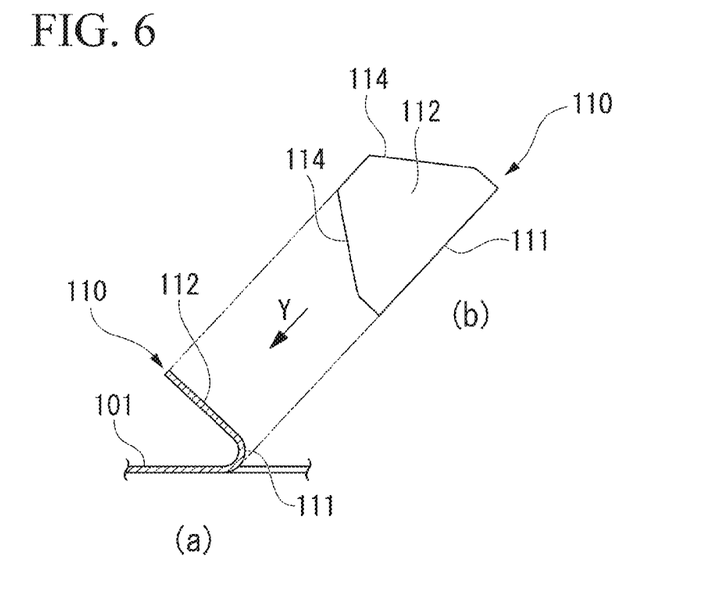
FIG. 6 is a view showing the shim plate of the disc brake according to the embodiment of the present invention, a part (a) showing a cross-sectional view taken along line X-X of FIG. 5C and a part (b) showing a view in a direction of an arrow Y of the part (a).

As shown in FIGS. 4B to 4D, the friction pad 13B has a mirror symmetrical shape with respect to a central position in the disc rotational direction (a leftward/rightward direction of FIGS. 4B to 4D). A attaching concave section 90 concaved to the inside in the disc radial direction (a lower side of FIG. 4C) at a central position in the disc rotational direction is formed at the edge section of the outside (an upper side of FIG. 4C) in the disc radial direction of the main plate section 43 configured to hold the friction material 40 of the rear plate 41 of the friction pad 13B. In addition, a pair of attaching cutout sections 91, 91 concaved to the outside in the disc radial direction at both end positions in the disc rotational direction, and a pair of attaching concave sections 92, 92 concaved to the outside in the disc radial direction at the inside position in the disc rotational direction are formed at the edge section of the inside in the disc radial direction of the main plate section 43.

A pair of engaging protrusions 93, 93 engaged with the above-mentioned return spring 45 are formed at the convex sections 44, 44 of the friction pad 13B to protrude to an opposite side of the friction material 40. In addition, a pair of engaging protrusions 94, 94 is also formed at the main plate section 43 near the convex sections 44, 44 to protrude to the disc axial direction opposite side of the friction material 40.

In the shim plates 83 and 84, the shim plate 83 disposed at the rear plate 41 side in the disc axial direction (the leftward/rightward direction of FIG. 4A) is a member formed of a metal plate such as a stainless steel plate or the like by press forming. The shim plate 83 has a main surface section 97, a pair of attaching portions 98 formed at both sides in the disc rotational direction of the edge section of the outside in the disc radial direction of the main surface section 97, and a pair of attaching portions 99, 99 formed at both sides in the disc rotational direction of the edge section of the inside in the disc radial direction of the main surface section 97.

In all of the pair of attaching portions 98, 98 and the pair of attaching portions 99, 99, the base end section on the main surface section 97 side forms the same plane as the main surface section 97, and the tip section opposite to the main surface section 97 side stands in a direction perpendicular to the main surface section 97. The main surface section 97 of the shim plate 83 abuts the main plate section 43 of the rear plate 41. Here, the tip sections of the pair of attaching portions 98, 98 are attached by the edge section of the outside in the disc radial direction of the main plate section 43, and the tip sections of the pair of attaching portions 99, 99 are attached by the pair of attaching concave sections 92, 92 of the inside in the disc radial direction of the main plate section 43.

In the shim plates 83 and 84, the shim plate 84 disposed at an opposite side of the rear plate 41 in the disc axial direction is also a member formed of a metal plate such as a stainless steel plate or the like by press forming. As shown in FIGS. 5A to 5C, the shim plate 84 has a main surface section (an opposite surface section) 101, a attaching portion 102 formed at a center in the disc rotational direction of the edge section of the outside (an upper side of FIG. 5C) in the disc radial direction of the main surface section 101, and a pair of attaching portions 103, 103 formed at both sides in the disc rotational direction of the edge section of the inside (a lower side of FIG. 5C) in the disc radial direction of the main surface section 101.

In all of the attaching portion 102 and the pair of attaching portions 103 and 103, the base end section on the main surface section 101 side forms the same plane as the main surface section 101, and the tip section opposite to the main surface section 101 stands in a direction perpendicular to the main surface section 101. A pair of engaging holes 105, 105 is formed in both sides in the disc rotational direction of the main surface section 101.

As shown in FIGS. 4A to 4D, the shim plate 84 contacts the main surface section 97 of the shim plate 83 such that the main surface section 101 opposes the main plate section 43 of the rear plate 41 while engaging the engaging protrusions 94, 94 with the pair of engaging holes 105, 105. Here, the tip section of the attaching portion 102 is attached by the attaching concave section 90 of the outside in the disc radial direction of the main plate section 43, and the tip sections of the pair of attaching portions 103, 103 are attached by the pair of attaching cutout sections 91, 91 of the inside in the disc radial direction of the main plate section 43.

Here, the engaging holes 105, 105 of the shim plate 84 are long holes being long in the disc rotational direction. A width in the disc rotational direction of the attaching concave section 90 of the rear plate 41 is larger than that in the disc rotational direction of the attaching portion 102 attached thereto. A minimum gap of the attaching cutout sections 91, 91 is smaller than that of the pair of attaching portions 103, 103. Accordingly, the shim plate 84 is attached by the friction pad 13B to be relatively moved within a predetermined allowable range in the disc rotational direction.

Then, in the embodiment, a pair of movement restriction portions 110 stand at the main surface section 101 of the shim plate 84 so as to protrude to an opposite side of the friction pad 13B in the disc axial direction. In the movement restriction portions 110, 110, a portion of the shim plate 84 is cut and stands at an opposite side of each of the tip sections of the attaching portion 102 and the pair of attaching portions 103, 103 from the main surface section 101 opposite to the friction pad 13B of the shim plate 84.

As shown in FIGS. 5A to 5C and 6, each of the pair of movement restriction portions 110, 110 has a curved surface section 111 extending to be continuing to the main surface section 101 and constituted by a portion of a cylindrical surface about an axis in the disc radial direction, and a flat surface section 112 extending from the end section of the curved surface section 111 opposite to the main surface section 101 to be continuing to the curved surface section 111. The flat surface sections 112, 112 of the pair of movement restriction portions 110, 110 are along the disc radial direction and extend to be inclined toward a center therebetween in the disc radial direction away from the main surface section 101 in the disc axial direction. Accordingly, the pair of movement restriction portions 110, 110 have a shape in the disc radial direction as a whole, and extend to be inclined toward a center therebetween away from the main surface section 101 in the disc axial direction as a whole.

Chamfered sections 114, 114 having a symmetrical shape inclined to narrow away from the curved surface section 111 are formed at both sides in the width direction of the flat surface sections 112, 112, respectively. Accordingly, the pair of movement restriction portions 110, 110 is formed to reduce widths thereof from the base end section toward the tip section.

As shown in FIGS. 4A to 4D, when the friction pad 13B attached with the shim plates 83 and 84 is attached to the pad support sections 31, 31 of the bracket 12 as shown in FIG. 2, the shim plate 84 contacts the reaction section 58 adjacent to the disc 11 in the main surface section 101, and the pair of movement restriction portions 110, 110 are disposed at a surface thereof opposite to the reaction section 58.

Figure 7:
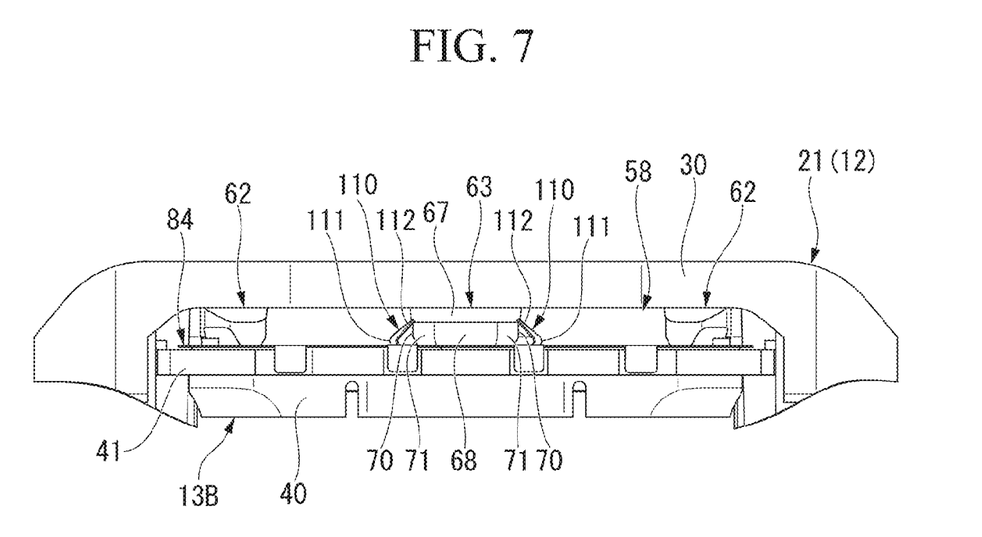
FIG. 7 is a bottom view showing major parts of the disc brake according to the embodiment of the present invention.

In this state, the pair of movement restriction portions 110, 110 are formed to extend in a direction away from the disc 11, and as shown in FIG. 7, stand at both sides of the intermediate claw section 63 disposed at a center in the disc rotational direction among the three claw sections 62, 63 and 62 of the reaction section 58. Further, in this state, the pair of movement restriction portions 110, 110 extend to be inclined toward a center in the disc rotational direction (a leftward/ rightward direction of FIG. 7) of the intermediate claw section 63 in the disc axial direction (an upward/downward direction of FIG. 7) from the main surface section 101, and the tip sides resiliently contact the intermediate claw section 63. In addition, in the embodiment, while the tip sides of the movement restriction portions 110, 110 resiliently contact the intermediate claw section 63, the tip sides of the movement restriction portions 110, 110 may contact the intermediate claw section 63 such that the tip sides merely come in contact with the intermediate claw section 63 without resiliently contacting the intermediate claw section 63, or may be disposed such that one movement restriction portion 110 of the movement restriction portions 110, 110 contacts the intermediate claw section 63 while the other movement restriction portion 110 form a small gap between the intermediate claw section 63. In addition, in the embodiment, while the movement restriction portions 110 stand at both sides of the intermediate claw section 63, the present invention is not limited thereto but only one movement restriction portion may be installed at a position that serves as an inlet side in the disc rotational direction upon progress of the vehicle with respect to the intermediate claw section 63.

Figure 8:
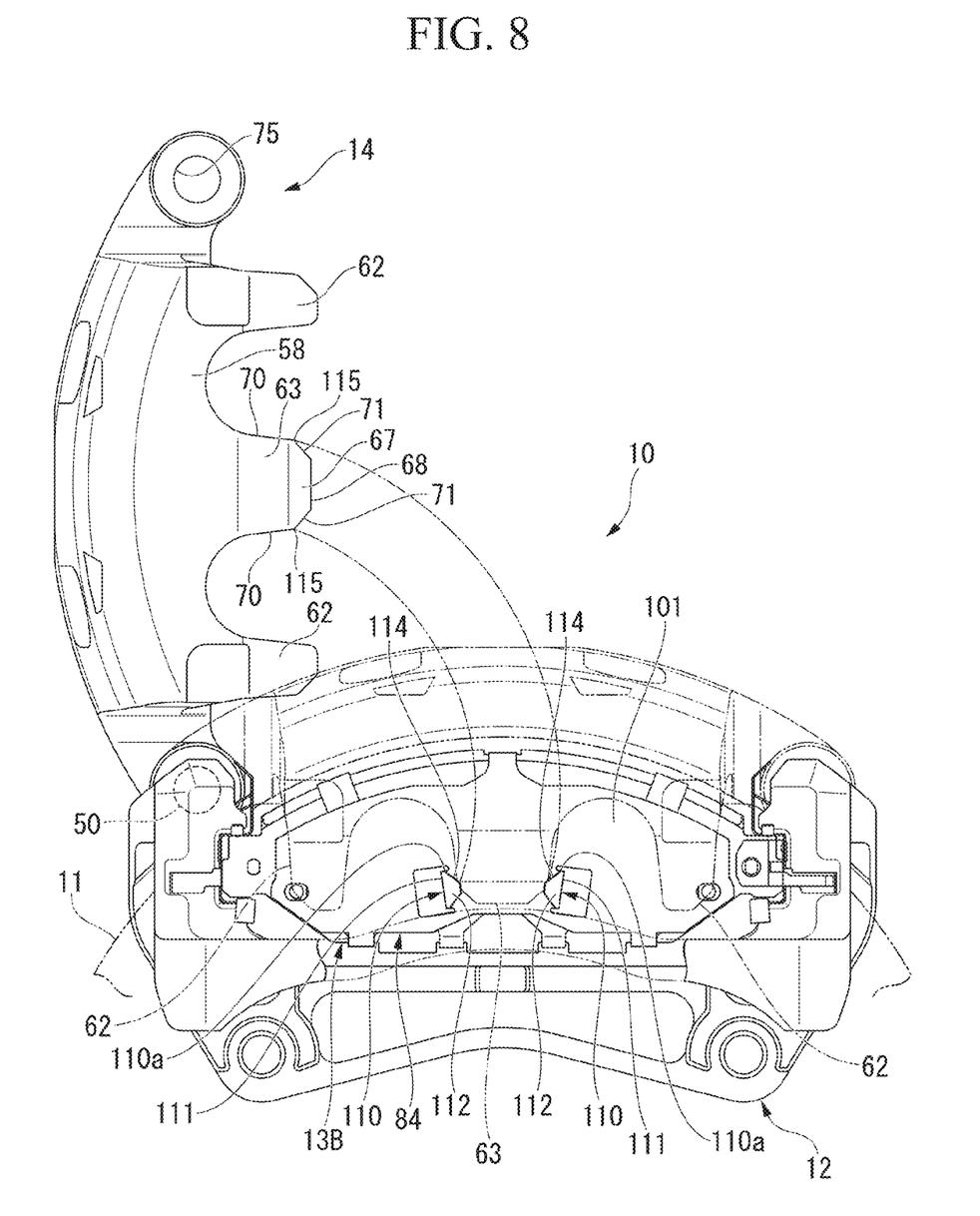
FIG. 8 is a front view showing a state upon maintenance of the disc brake according to the embodiment of the present invention.

Specifically, each of the pair of movement restriction portions 110, 110 contacts an angled section 115 shown in FIG. 8 which is a boundary between the tip outer surface section 67, the intermediate side surface section 70 and the tip side surface section 71 of the intermediate claw section 63 in the flat surface section 112. Accordingly, as shown in FIG. 7, the pair of movement restriction portions 110, 110 contact the intermediate claw section 63 from both sides in the disc rotational direction and an opposite side of the disc 11 (not shown in FIG. 7) in the disc axial direction. Here, the pair of movement restriction portions 110, 110 is resiliently deformed toward an opposite side of the intermediate claw section 63. Accordingly, the pair of movement restriction portions 110, 110 biases the intermediate claw section 63 from both sides in the disc rotational direction and an opposite side of the disc 11 in the disc axial direction. As a result, the shim plate 84 is engaged with the intermediate claw section 63 to be held at a certain position in the disc axial direction and the disc rotational direction by a biasing force of the pair of movement restriction portions 110, 110. In addition, as shown in FIG. 8, a gap in the disc rotational direction of end sections 110a, 110a of the outside in the disc radial direction of the pair of movement restriction portions 110, 110 is larger than a gap in the disc rotational direction of the pair of angled sections 115, 115 of the intermediate claw section 63.

Here, in the above-mentioned disc brake 10, maintenance of the disc brake 10 such as exchange of the friction pads 13A and 13B is carried out according to the following steps. Firstly, the attachment bolt 76 of the one slide pin 50 in the disc rotational direction shown in FIG. 1 is removed from the pin main body 77 fitted into the guide hole 78 and the through-hole 75 of the caliper 14. As shown in FIG. 8, the caliper 14 is rotated with respect to the bracket 12 about the other slide pin 50 in the disc rotational direction. Thereby, the outside in the disc radial direction and both sides in the disc axial direction of the friction pads 13A and 13B are opened. In this state, the friction pad 13A is replaced with a new one together with the shim plates 81 and 82, the friction pad 13B is replaced with a new one together with the shim plates 83 and 84, and the caliper 14 is rotated and returned with respect to the bracket 12 about the other slide pin 50 in the above-mentioned disc rotational direction.

Here, a gap in the disc rotational direction of the end sections 110a, 110a of the outside in the disc radial direction of the pair of movement restriction portions 110, 110 is larger than the gap in the disc rotational direction of the pair of angled sections 115, 115 of the intermediate claw section 63. Accordingly, even when the caliper 14 is rotated with respect to the bracket 12 about either of the slide pins 50, 50, the end sections 110a, 110a of the outside in the disc radial direction of the pair of movement restriction portions 110, 110 do not contact the intermediate claw section 63. Thereby, the pair of angled sections 115, 115 of the intermediate claw section 63 contact the tip sides of the flat surface sections 112, 112 of the pair of movement restriction portions 110, 110. Then, the attachment bolt 76 of the one slide pin 50 in the disc rotational direction is inserted into the through-hole 75 of the caliper 14 and threadedly engaged with the pin main body 77 fitted in the guide hole 78, and the caliper 14 is attached to the bracket 12.

Here, when the pistons 52, 52 of the caliper 14 and the reaction section 58 press the friction pads 13A and 13B toward the disc 11 and the friction pads 13A and 13B come in contact with the disc 11, the friction pads 13A and 13B move with the disc 11 until contacting the pad support sections 26 and 31 at the outlet side in the rotational direction thereof, and the pad support sections 26 and 31 which receive further torque are deformed toward the outlet side in the disc rotational direction.

Here, a frictional force is generated between the shim plate 84 and the reaction section 58 by the pressing force. As the shim plate 84 is relatively slidably attached with the friction pad 13B in the disc rotational direction, the shim plate 84 causes sliding between the friction pad 13B moving to the outlet side in the disc rotational direction as described and the shim plate 83 contacting the friction pad 13B and relatively moves (moves to the inlet side in the disc rotational direction with respect to the friction pad 13B), and movement to the outlet side in the disc rotational direction of the reaction section 58 is suppressed. In addition, like in the friction pad 13A, the shim plates 81 and 82 are slid to suppress movement to the outlet side in the disc rotational direction of the pistons 52, 52. Here, since the pad support section 31 of the outer side is spaced apart from the attachment base section 20 farther than the pad support section 26 of the inner side, deformation of the pad support section 31 of the outer side is larger than that of the pad support section 26 of the inner side, and the axis of the caliper 14 is inclined in the disc axial direction when there is no sliding of the shim plate. However, in the embodiment, inclination of the axis of the caliper 14 in the disc axial direction is suppressed by the sliding of the shim plate, and the state in which the slide pins 50, 50 can be smoothly slid with respect to the guide holes 78, 78 is maintained.

When pressing of the friction pads 13A and 13B to the disc 11 by the pistons 52, 52 of the caliper 14 and the reaction section 58 is released from the above-mentioned state, deformation of the pad support sections 26 and 31 is released, and the friction pads 13A and 13B are returned to the inlet side in the disc rotational direction. Here, focusing on the friction pad 13B, the frictional force between the shim plate 84 and the reaction section 58 is substantially released by the release of the pressing force. If the pair of movement restriction portions 110, 110 is not provided, the shim plate 84 returns to the inlet side in the disc rotational direction while the shim plate 84 is in a state in which the shim plate 84 relatively moves relative to the inlet side in the disc rotational direction with respect to the friction pad 13B and the shim plate 83 contacting the friction pad 13B. Then, upon the pressing after that, the shim plate 84 relatively moves from this position to the inlet side in the disc rotational direction with respect to the friction pad 13B and the shim plate 83 contacting the friction pad 13B, and the relative movement exceeds the allowable range due to repetition of the pressing and release of the pressing. As a result, the attaching portion 102 contacts the end section in the disc rotational direction of the attaching concave section 90 and the attaching portion 103 contacts the end section in the disc rotational direction of the attaching cutout section 91, causing generation of the deformation.

On the other hand, the shim plate 84 of the embodiment remains with the intermediate claw section 63 because the pair of movement restriction portions 110, 110 are attached with the intermediate claw section 63, and relatively moves to the outlet side in the disc rotational direction with respect to the friction pad 13B moving to the inlet side in the disc rotational direction and the shim plate 83 contacting the friction pad 13B, returning to its original position. Accordingly, contacting of the attaching portion 102 on the end section in the disc rotational direction of the attaching concave section 90 or contacting of the attaching portion 103 on the end section in the disc rotational direction of the attaching cutout section 91 described above can be suppressed, and deformation of the attaching portions 102 and 103 is suppressed.

According to the above-mentioned disc brake of the embodiment, the movement restriction portions 110, 110 are formed to contact the intermediate claw section 63 disposed at the center among the claw sections 62, 63 and 62 of the reaction section 58. Further, the movement restriction portions 110, 110 are formed in the disc radial direction. For this reason, when the caliper 14 is rotated about the slide pin 50 upon exchange of the friction pads 13A and 1313, despite being rotated about either of the slide pins 50, 50, generation of interference can be suppressed. Accordingly, workability upon maintenance such as exchange of the pad can be improved.

The movement restriction portions 110, 110 are formed at a position at which the intermediate claw section 63 disposed in the middle thereof does not contact, even when the end sections 110a, 110a of the outside in the disc radial direction rotate the caliper 14 about either of the slide pins 50, 50 with respect to the bracket 12. For this reason, interference of the intermediate claw section 63 with the end sections 110a, 110a can be prevented. Accordingly, workability of maintenance can be further improved.

Since the movement restriction portions 110, 110 stand at both sides of the intermediate claw section 63 disposed in the middle in the disc rotational direction, movement of the shim plate 84 with respect to the intermediate claw section 63 is restricted with respect to bidirectional rotation of the disc 11.

Since the movement restriction portions 110, 110 extend to be inclined toward the middle in the disc rotational direction of the intermediate claw section 63 disposed in the middle in the disc axial direction and contact the intermediate claw section 63 at the tip sides thereof, relative movement in the disc rotational direction with respect to the intermediate claw section 63 can be appropriately restricted.

Since the movement restriction portions 110, 110 are formed to be reduced in size as it moves from the base end section toward the tip section, interference generated when the caliper 14 is rotated about the slide pin 50 can be further suppressed.

In addition, in the above-mentioned embodiment, while the caliper 14 in which the two pistons 52, 52 are disposed in parallel in the disc rotational direction has been exemplarily described, the present invention can also be applied to a caliper in which three or more pistons are disposed in parallel in the disc rotational direction. Even in this case, since the number of the recesses in the reaction section is equal to the number of pistons, the number of claw sections is one more than that of the pistons, that is, the number of claw sections is four. In addition, the number of claw sections may be 4, 5, 6, or more than 7 regardless with the number of pistons, as long as the number of claw sections is more than three.

The above-mentioned embodiment is a disc brake including an bracket attached to a vehicle, a pair of friction pads movably supported by the bracket and disposed at both surfaces of a disc, and a caliper movably supported with respect to the bracket in an axial direction of the disc, wherein the caliper has a cylinder section in which a plurality of pistons configured to press one friction pad of the pair of friction pads are installed in parallel in a rotational direction of the disc, a bridge section extending from the cylinder section to straddle an outer circumference of the disc, a reaction section extending from the bridge section inward in a radial direction of the disc and configured to press the other friction pad of the pair of friction pads, and an arm section extending from the cylinder section in the rotational direction of the disc and having a tip side to which a slide pin guided to the bracket is attached. A shim plate attached with the other friction pad to be relatively moved in the rotational direction of the disc is disposed between the other friction pad and the reaction section. A plurality of claw sections are formed at the reaction section to extend in the radial direction of the disc at a position deviated in the rotational direction of the disc with respect to a center of the piston. A movement restriction portion that is capable of contacting a claw section disposed at a middle of claw sections of the reaction section is formed at a surface of the shim plate opposite to the reaction section in the radial direction of the disc. As described above, since the movement restriction portion is formed to contact the claw section disposed at the middle of the claw sections of the reaction section and formed in the radial direction of the disc, interference generated when the caliper is rotated about the slide pin can be suppressed. Accordingly, workability of maintenance of the disc brake can be improved.

In addition, the movement restriction portion is formed to be cut and stands from a surface section of the shim plate opposite to the other friction pad and extends in a direction away from the disc. The movement restriction portion is formed at a position at which the claw section disposed at the middle does not contact when the end section of the outside in the radial direction of the disc rotates the caliper about the slide pin with respect to the bracket. Accordingly, the movement restriction portion can prevent interference with the claw section disposed at the middle of the end section. Therefore, workability of maintenance of the disc brake can be further improved.

In addition, the movement restriction portions stand at both sides of the claw section disposed at the middle in the rotational direction of the disc. For this reason, movement of the shim plate with respect to the claw section can be restricted with respect to a bidirectional rotation of the disc.

In addition, the movement restriction portion extends to be inclined in the rotational direction of the disc toward the center of the claw section disposed in the middle in the axial direction of the disc, and the tip side contacts the claw section disposed at the middle. For this reason, relative movement in the disc rotational direction of the shim plate with respect to the claw section is appropriately restricted.

Further, since the movement restriction portion is formed to be reduced in size away from the base end section and toward the tip section, interference generated when the caliper is rotated about the slide pin can be further suppressed.

Hereinabove, while the exemplary embodiment of the present invention has been described, the present invention is not limited thereto. Addition, omission, substitution, and other modifications of components can be made without departing from the spirit of the present invention. The present invention is not limited to the above-mentioned description but may be limited by the accompanying claims.

The invention claimed is:

1. A disc brake comprising:
a bracket configured to be attached to a vehicle;
a pair of friction pads movably supported by the bracket and disposed at both surfaces of a disc; and
a caliper movably supported with respect to the bracket in an axial direction of the disc, wherein the caliper comprises:
  a cylinder section in which a plurality of pistons configured to press one friction pad of the pair of friction pads are installed in parallel in a rotational direction of the disc,
  a bridge section extending from the cylinder section to straddle an outer circumference of the disc,
  a reaction section extending from the bridge section inward in a radial direction of the disc and configured to press the other friction pad of the pair of friction pads, and
  an arm section extending from the cylinder section in the rotational direction of the disc and having a tip side to which a slide pin guided to the bracket is attached,
wherein in that a shim plate attached with the other friction pad to be relatively moved in the rotational direction of the disc is disposed between the other friction pad and the reaction section,
wherein three or more claw sections are formed at the reaction section to extend in the radial direction of the disc at a position deviated in the rotational direction of the disc with respect to a center of the plurality of pistons,
wherein at least one movement restriction portion that is configured to contact a middle claw section disposed at a middle of the three or more claw sections of the reaction section is formed on a surface of the shim plate opposite to the reaction section along the radial direction of the disc, the movement restriction portion being stood up in a direction separating from the disc, and
wherein the at least one movement restriction portion attaches the shim plate to the middle claw section.

2. The disc brake according to claim 1, wherein the at least one movement restriction portion is formed by cutting and bending a part of the shim plate from a surface section of the shim plate opposite to the other friction pad and extending in a direction away from the disc, and the at least one movement restriction portion is formed at a position at which the middle claw section does not contact with the end section of the at least one movement restriction portion at the outside in the radial direction of the disc when the caliper rotates about the slide pin with respect to the bracket.

3. The disc brake according to claim 1, wherein a plurality of movement restriction portions are provided and the movement restriction portions are located on opposite sides of the middle claw section in the rotational direction of the disc.

4. The disc brake according to claim 3, wherein a tip side of one of the plurality of movement restriction portions contacts the middle claw section.

5. The disc brake according to claim 3, wherein tip sides of movement restriction portions which are located on opposite sides of the middle claw section in the rotational direction of the disc contact the middle claw section.

6. The disc brake according to claim 1, wherein the at least one movement restriction portion stands only at an inlet side of the rotational direction of the disc with respect to the middle claw section.

7. The disc brake according to claim 1, wherein the at least one movement restriction portion extends to be inclined in the rotational direction of the disc toward a center of the middle claw section in the axial direction of the disc, and the tip side contacts the middle claw section.

8. The disc brake according to claim 7, wherein the at least one movement restriction portion is formed to be reduced in size as it moves from a base end toward the tip side.

9. The disc brake according to claim 1, wherein the shim plate is provided with a hole configured to engage with a protrusion protruding in the axial direction of the disc from the friction pad.

10. The disc brake according to claim 1, wherein the at least one movement restriction portion stands at least at an inlet side of the rotational direction of the disc with respect to the middle claw section.

11. A disc brake comprising:
a caliper configured to press a pair of friction pads on a disc wherein the pair of friction pads is movably supported by a bracket configured to be attached on a vehicle, wherein the caliper comprises:

a plurality of pistons disposed in parallel in a rotational direction of the disc so as to oppose one friction pad of the pair of friction pads; and three or more claw sections disposed opposing to the other friction pad of the pair of friction pads at a side opposite to the plurality of pistons with respect to the disc, wherein a shim plate attached with the other friction pad is disposed between the other friction pad and the claw sections, wherein a plurality of movement restriction portions that are configured to contact a middle claw section of the three or more claw sections are configured to be resiliently deformed, wherein the movement restriction portions are formed on a surface of the shim plate along the radial direction of the disc on opposite sides of the middle claw section in the rotational direction of the disc and are stood up in a direction separating from the disc, and wherein the movement restriction portions attach the shim plate to the middle claw section.

12. The disc brake according to claim 11, wherein the movement restriction portions are formed by cutting and bending a part of the shim plate from a surface section of the shim plate opposite to the other friction pad and extending in a direction away from the disc.

13. The disc brake according to claim 11, wherein the movement restriction portions are formed at a position at which the middle claw section does not contact with the end section of the movement restriction portions at the outside in the radial direction of the disc when the caliper rotates about a supporting portion of the bracket with respect to the bracket.

14. The disc brake according to claim 11, wherein a tip side of one of the each movement restriction portions contacts the middle claw section.

15. The disc brake according to claim 11, wherein tip sides of the movement restriction portions resiliently contact the middle claw section.

16. The disc brake according to claim 11, wherein the movement restriction portions extend to be inclined in the rotational direction of the disc toward a center of the middle claw section in the axial direction of the disc, and the tip side contacts the middle claw section.

17. The disc brake according to claim 16, wherein the movement restriction portions are formed to be reduced in size as it moves from a base end toward the tip.

18. The disc brake according to claim 11, wherein the shim plate is provided with a hole configured to engage with a protrusion protruding in the axial direction of the disc from the friction pad.

19. A disc brake comprising:

a caliper configured to press one friction pad of a pair of friction pads disposed on both sides of a disc by a plurality of pistons disposed in parallel in a rotational direction of the disc, the caliper is provided with three or more claw sections configured to press another friction pad of the pair of friction pads;

a shim plate attached with the other friction pad disposed between the other friction pad and the claw sections; and a plurality of movement restriction portions that resiliently contact a middle claw section of the three or more claw sections are provided at a surface of the shim plate on opposite sides of the middle claw section in a rotational direction of the disc, the movement restriction portions extending in an axial direction of the disc along a radial direction of the disc and configured to be resiliently deformed to hold the shim plate at a certain position in the rotational direction of the disc with respect to the middle claw section.

20. The disc brake according to claim 19, wherein the movement restriction portions are formed by cutting and bending a part of the shim plate from a surface section of the shim plate opposite to the other friction pad and extending in a direction away from the disc.

21. The disc brake according to claim 19, wherein the movement restriction portions are formed at a position at which the middle claw section does not contact with the end section of the movement restriction portions at the outside in the radial directed of the disc when the caliper rotates about an one end portion of the friction pad in the rotational direction of the friction pad with respect to the friction pad.

* * * * *